US012744858B2

(12) United States Patent
Liang

(10) Patent No.: US 12,744,858 B2
(45) Date of Patent: Sep. 22, 2026

(54) COLOR CORRECTION METHOD, IMAGE FORMING DEVICE AND STORAGE MEDIUM

(71) Applicant: Zhuhai Pantum Electronics Co., Ltd., Zhuhai (CN)

(72) Inventor: Jiajun Liang, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 255 days.

(21) Appl. No.: 18/601,560

(22) Filed: Mar. 11, 2024

(65) Prior Publication Data

US 2024/0314256 A1 Sep. 19, 2024

(30) Foreign Application Priority Data

Mar. 16, 2023 (CN) ........................ 202310258865.7
Jan. 24, 2024 (CN) ........................ 202410104323.9

(51) Int. Cl.
*H04N 1/60* (2006.01)
*H04N 1/00* (2006.01)
*H04N 1/23* (2006.01)

(52) U.S. Cl.
CPC ....... *H04N 1/6027* (2013.01); *H04N 1/00763* (2013.01); *H04N 1/2346* (2013.01); *H04N 1/6044* (2013.01)

(58) Field of Classification Search
None
See application file for complete search history.

(56) References Cited

U.S. PATENT DOCUMENTS

2008/0174834 A1* 7/2008 Ueda ...................... G03G 15/01 358/488
2012/0038731 A1* 2/2012 Takahashi .......... G03G 15/0189 347/116
2022/0382202 A1* 12/2022 Iwasaki ............. G03G 15/5054

FOREIGN PATENT DOCUMENTS

JP 2013021467 A 1/2013
JP 2015087407 A 5/2015
JP 2021153242 A 9/2021

OTHER PUBLICATIONS

The European Patent Office (EPO) Office Action for Application No. 24161296.9 Mar. 31, 2025 6 Pages.
The European Patent Office (EPO) The Extended European Search Report for 24161296.9 Jul. 1, 2024 9 Pages.

* cited by examiner

*Primary Examiner* — Helen Zong
(74) *Attorney, Agent, or Firm* — Anova Law Group, PLLC

(57) ABSTRACT

A color correction method, an image forming device and a storage medium are provided. The color correction method includes acquiring a job to be processed, inserting a first image into part of or each of intervals between adjacent job pages of the job to be processed, and/or, inserting the first image before/after a specific job page included in the job to be processed. The first image is configured to trigger color correction. The method also includes obtaining a detection result of a transfer image formed by the first image on an image carrier, determining whether the detection result meets a condition for triggering color correction, and when the detection result meets the condition for triggering color correction, performing color correction.

20 Claims, 6 Drawing Sheets

COLOR CORRECTION METHOD, IMAGE FORMING DEVICE AND STORAGE MEDIUM

CROSS-REFERENCE TO RELATED APPLICATION

This application claims priority of Chinese Patent Application No. 202310258865.7, filed on Mar. 16, 2023, and Chinese Patent Application No. 202410104323.9, filed on Jan. 24, 2024, the entire content of all of which is hereby incorporated by their reference.

FIELD OF THE DISCLOSURE

The present disclosure generally relates to the field of image forming technology and, more particularly, relates to a color correction method, an image forming device and a storage medium.

BACKGROUND

Image forming devices are devices that may form images on imaging media based on imaging principles. Image forming devices include but not limited to printers, copiers, fax machines, scanners, multi-function devices, electrostatic printing devices, and other devices that may implement image forming functions. In order to ensure the image-quality of the image formation, image forming devices may need to be color corrected. In related technologies, conditions that may trigger color correction include that: consumables used by an image forming device are new, a quantity of job pages printed reaches a set value, or ambient temperature and humidity change significantly. However, when the above method is used, there may be situations where the image quality may be already poor, but the trigger conditions for color correction may have not yet been met, and printing effects of the image forming device may thus be affected.

BRIEF SUMMARY OF THE DISCLOSURE

One aspect of the present disclosure includes a color correction method. The method includes acquiring a job to be processed, inserting a first image into part of or each of intervals between adjacent job pages of the job to be processed, and/or, inserting the first image before/after a specific job page included in the job to be processed. The first image is configured to trigger color correction. The method also includes obtaining a detection result of a transfer image formed by the first image on an image carrier, determining whether the detection result meets a condition for triggering color correction, and when the detection result meets the condition for triggering color correction, performing color correction.

Another aspect of the present disclosure includes an image forming device. The image forming device includes a processor and a memory communicatively connected to the processor. A computer program is stored in the memory. When the computer program is executed, the processor is configured to: acquire a job to be processed; insert a first image into part of or each of intervals between adjacent job pages of the job to be processed, and/or, insert the first image before/after a specific job page included in the job to be processed, wherein the first image is configured to trigger color correction; obtain a detection result of a transfer image formed by the first image on an image carrier; determine whether the detection result meets a condition for triggering color correction; and when the detection result meets the condition for triggering color correction, perform color correction.

Another aspect of the present disclosure includes a storage medium. The medium includes a stored program. When the stored program is in operation, the stored program controls a device where the computer-readable storage medium is located to perform a color correction method. The method includes acquiring a job to be processed, inserting a first image into part of or each of intervals between adjacent job pages of the job to be processed, and/or, inserting the first image before/after a specific job page included in the job to be processed. The first image is configured to trigger color correction. The method also includes obtaining a detection result of a transfer image formed by the first image on an image carrier, determining whether the detection result meets a condition for triggering color correction, and when the detection result meets the condition for triggering color correction, performing color correction.

As disclosed, the technical solutions of the present disclosure have the following advantages.

In the present disclosure, when the image forming device acquires a job to be processed, the image forming device may insert a first image into part of or each of intervals between adjacent job pages of the job to be processed, or may insert the first image before/after a specific job page included in the job to be processed. The first image may enter an image forming workflow along with the job to be processed. During an image-forming process for the first image, an image forming device may acquire a detection result of a transfer image formed based on the first image. According to the detection result, the image forming device may determine image quality of a currently output image, and also determine whether a condition for triggering color correction is currently met. When the condition for triggering color correction is met, color correction may be performed in time. Accordingly, the timeliness of color correction performed by the image forming device and the image quality of the image output by the image forming device may be improved.

BRIEF DESCRIPTION OF THE DRAWINGS

In order to explain the technical solutions in the embodiments of the present disclosure or the prior art more clearly, the following is a brief introduction of the drawings required to be used in the embodiments or the prior art. Obviously, the drawings in the following description are only some embodiments of the present disclosure, and other drawings can be obtained from these drawings without any inventive effort for those of ordinary skill in the art.

DETAILED DESCRIPTION

To make the objectives, technical solutions and advantages of the present disclosure clearer and more explicit, the present disclosure is described in further detail with accompanying drawings and embodiments. Obviously, the described embodiments are only some of rather than all the embodiments of the present disclosure. Based on the described embodiments, all other embodiments obtained by those of ordinary skill in the art without inventive effort shall fall within the scope of the present disclosure.

In existing technologies, an image forming device may perform color correction when consumables used are new, a quantity of job pages printed reaches a set value, or ambient temperature and humidity change significantly. However, when using this method, there may be situations where image quality may be already poor, but trigger conditions for color correction may have not yet been met. Accordingly, an image forming device may be still unable to trigger color correction when the output image quality is poor, and the operation effect of the image forming device may be affected.

To solve the above problems, the embodiments of the present disclosure provide a color correction method. In the color correction method in the embodiments of the present disclosure, when a job to be processed is acquired, a first image may be inserted into part of or each of intervals between adjacent job pages of the job to be processed, and/or, the first image may be inserted before/after a specific job page included in the job to be processed. The first image may enter an image forming workflow along with the job to be processed. During an image-forming process for the first image, an image forming device may acquire a detection result of a transfer image formed based on the first image. According to the detection result, the image forming device may determine image quality of a currently output image, and also determine whether a condition for triggering color correction is currently met. When the condition for triggering color correction is met, color correction may be performed in time. Accordingly, the quality of images output by the image forming device may be improved.

Figure 1:
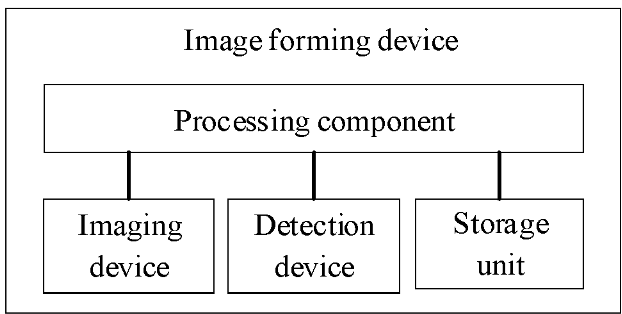
FIG. 1 illustrates a schematic structure diagram of an image forming device consistent with the disclosed embodiments of the present disclosure.

FIG. 1 illustrates a schematic structure diagram of an image forming device consistent with the disclosed embodiments of the present disclosure. As shown in FIG. 1, the image forming device includes a processing component, an imaging device, a detection device, and a storage unit. The imaging device, the detection device, and the storage unit each are electrically connected to the processing component. The processing component is a main control unit of the image forming device, and is configured to control the imaging device, the detection device and the storage unit. The storage unit is configured to store program instructions to be executed by the processing component. The storage unit is also configured to store intermediate data required during the execution of the program instructions, data collected by sensor components, etc., for the processing component to retrieve and run.

Figure 2:
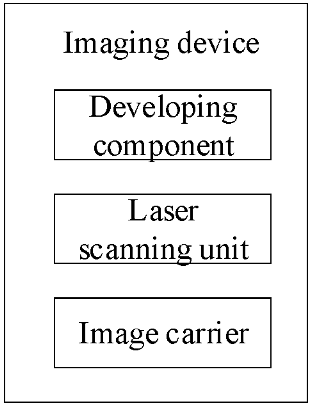
FIG. 2 illustrates a schematic component diagram of an imaging device consistent with the disclosed embodiments of the present disclosure.

The imaging device is configured to image the job to be processed under control of the processing component. FIG. 2 illustrates a schematic component diagram of an imaging device consistent with the disclosed embodiments of the present disclosure. As shown in FIG. 2, the imaging device mainly includes a developing component, a laser scanning unit (LSU), and an image carrier.

Figure 3:
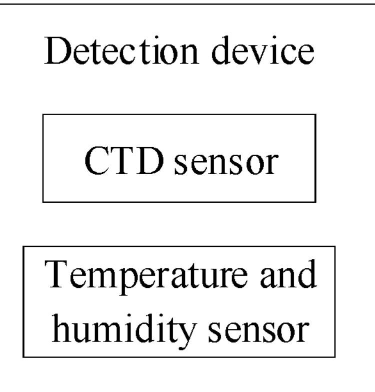
FIG. 3 illustrates a schematic component diagram of a detection device consistent with the disclosed embodiments of the present disclosure.

The detection device is configured to obtain relevant data of the environment where the imaging device is located. FIG. 3 illustrates a schematic component diagram of a detection device consistent with the disclosed embodiments of the present disclosure. As shown in FIG. 3, the detection device may include a counterpoint density (CTD) sensor and a temperature and humidity sensor. The CTD sensor is configured to detect the transfer image formed on the image carrier. The image carrier may be a transfer belt or a photosensitive drum. The transfer belt may be an intermediate transfer belt, a primary transfer belt, or the like. The temperature and humidity sensor is configured to collect temperature and humidity of current environment.

Figure 4:
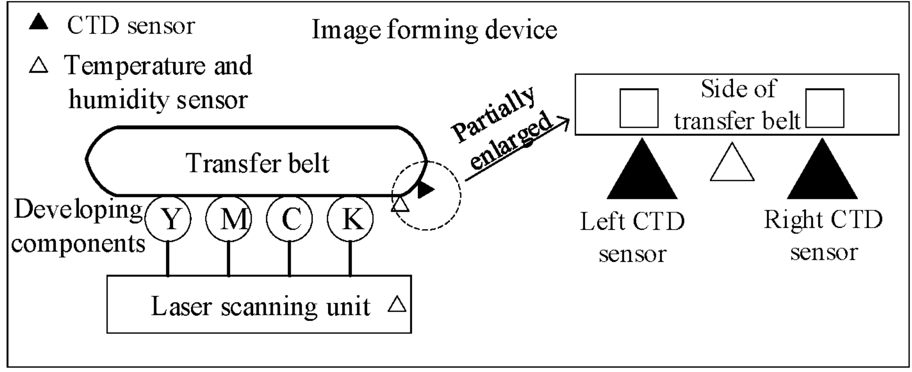
FIG. 4 illustrates a schematic structure diagram of another image forming device consistent with the disclosed embodiments of the present disclosure.

FIG. 4 illustrates a schematic structure diagram of another image forming device consistent with the disclosed embodiments of the present disclosure. A specific layout configuration of the developing component, the LSU component, the image carrier, the CTD sensor, and the temperature and humidity sensor is shown in FIG. 4.

Referring to FIGS. 1-4, an operation process of the image forming device includes: the processing component acquiring a job to be processed. To determine when to trigger color correction while a job to be processed is being printed, the processing component may insert a first image into part of or each of intervals between adjacent job pages of the job to be processed, and/or, may insert the first image before/after a specific job page included in the job to be processed. The first image may enter an image forming process along with the job to be processed. Specifically, the processing component may convert the job to be processed and the first image inserted into an image to be formed. According to the image to be formed, the processing component controls the LSU component to expose a uniformly charged photosensitive drum, so as to form an electrostatic latent image corresponding to the image to be formed on a surface of the photosensitive drum. Further, the processing component may control the developing device to supply developer to the electrostatic latent image to form a visible image on the surface of the photosensitive drum. As shown in FIG. 4, Y, M, C and K are configured to provide yellow, magenta, cyan and black developers respectively. The visible image formed on the surface of the photosensitive drum may be transferred to a transfer belt. The image with the developer on the transfer belt may be to transferred to an imaging medium (such as a physical paper), and an image may thus be formed on the imaging medium.

Optionally, in the present disclosure, the image formed on the photosensitive drum or the transfer belt is also called a transfer image. Optionally, in the present disclosure, the transfer image corresponding to the job to be processed may be transferred to the imaging medium, and the transfer image corresponding to the first image may not be transferred to the imaging medium. As such, normal execution of the job to be processed may be performed.

In some embodiments of the present disclosure, the image forming device includes a CTD sensor. As shown in FIG. 4, the CTD sensor may include a left CTD sensor and a right CTD sensor. The left CTD sensor and the right CTD sensor are arranged on two sides of the transfer belt along a width direction of the transfer belt. When the job to be processed and the first image form a transfer image on the transfer belt, the left CTD sensor and the right CTD sensor may detect the transfer image on the transfer belt, especially the transfer image of the first image. The left CTD sensor and the right CTD sensor may send the detection results to the processing component. Based on the CTD detection results, the processing component may determine whether the current moment is the time to trigger color correction. In the present disclosure, the CTD sensor disposed on the transfer belt may detect the transfer image, such that the color correction method in the present disclosure may be performed.

The image forming device may also include a temperature and humidity sensor. As shown in FIG. 4, the temperature and humidity sensor may be disposed on the transfer belt or the LSU component to detect ambient temperature and humidity. The temperature and humidity sensor may transmit the collected ambient temperature and humidity data to the processing component. Based on the CTD detection results and the ambient temperature and humidity, the processing component may determine whether the current moment is the time to trigger color correction, or the processing component can determine which color correction mode may be adopted or which image may be used as the first image according to the ambient temperature and humidity. In addition, the temperature and humidity sensor may also be disposed near the LSU component to collect the ambient temperature and humidity near the LSU component. The processing component may determine whether the current moment is the time to trigger color correction based on the CTD detection results and the LSU temperature change. The processing component may also determine which color correction mode may be adopted or which image may be used as the first image based on the temperature change of the LSU component.

The color correction may include a plurality of types, such as Auto Color Registration (ACR) correction and density correction.

Auto Color Registration (ACR): the color image forming device may print a color image on a printing paper using four colors of yellow, magenta, cyan, and black, and perform ACR to accurately align color registration at a desired position on the printing paper. The purpose of ACR includes correcting relative positions of the four colors, such that images of the four colors may be accurately aligned. In addition, when the ACR is performed, the image quality may be improved. For example, a color printer may use four colors of CMYK to form an image. Before printing the image, color registration may be required such that the CMY and K colors may be aligned. When the CMY and K colors are misaligned, for example, using yellow and cyan to form a green image, the resulting image may be decomposed into two colors. As such, ACR correction may be required. By ACR correction, lighting delay may be adjusted by detecting actual positions of CMY relative to K, such that the image color registration effect may be made to be within product specifications. The ACR correction may include long ACR correction and short ACR correction. Correction effects of the long ACR correction and the short ACR correction may be equivalent. Since an image length of the short ACR correction may shorter than an image length of the long ACR correction, the short ACR correction may save correction time.

The density correction mainly includes Dmax correction, laser diode (LD) light intensity correction, and Gamma correction.

Dmax correction: a voltage value corresponding to a target color density value may be obtained by detecting a color density value of a color block corresponding to each voltage. The voltage value is mainly a developing voltage. A charging voltage may be adjusted according to the developing voltage. By using the adjusted voltage value, the image color density may be kept within the target specifications.

LD light intensity correction (i.e., LSU optical power correction): the optical power of the LSU may be corrected such that the LSU may use appropriate optical power for exposure. An LD power value corresponding to a target color density may be obtained by detecting the color density value of the color block corresponding to each LD power. By using the adjusted LD power, reproducibility of image points and lines may be improved, and the image may become delicate.

Gamma correction: a Gamma curve of the image forming device may be adjusted to achieve good image gradation reproducibility. Gamma correction includes long Gamma correction and short Gamma correction. Correction effects of the long Gamma correction and the short Gamma correction may be equivalent, and the short Gamma correction may save correction time. When performing color correction, the CTD sensor may also be adjusted. By adjusting the LED light power of the CTD sensor, the background voltage of the specular reflection channel may be adjusted to a fixed value, such that consistency of multiple calibrations on multiple machines may be achieved.

In addition, color correction may be generally classified into correction of color modes and correction of black and white modes. In the correction of color modes, since a color image needs to be formed, the ACR correction and the density correction may need to be performed to correct relative positions of the images formed. In the correction of black and white modes, the density correction may be required to adjust the image density.

Figure 5:
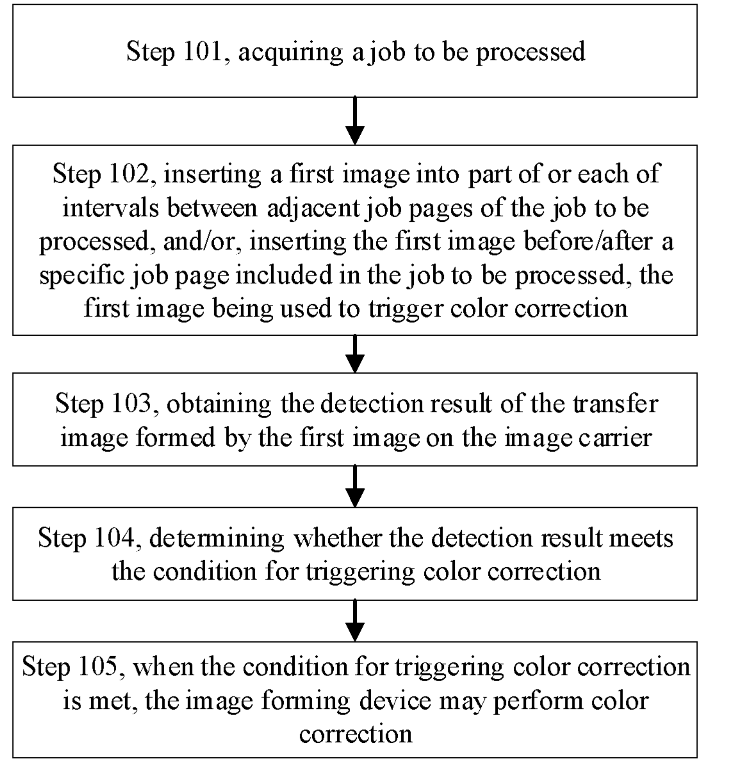
FIG. 5 illustrates a flow chart of a color correction method consistent with the disclosed embodiments of the present disclosure.

FIG. 5 illustrates a flow chart of a color correction method consistent with the disclosed embodiments of the present disclosure. Referring to FIGS. 1-4, in the embodiments of the present disclosure also provides a color correction method. The execution subject of the method shown in FIG. 5 is an image forming device, and more specifically, the processing component in the image forming device. As shown in FIG. 5, processing steps of the method include steps 101-105.

Step 101, acquiring a job to be processed. Optionally, the image forming device may obtain the job to be processed from an electronic device or directly obtain the job to be processed pre-stored by the image forming device. The electronic devices may be, for example, a computer, a laptop, a mobile phone, a wearable device, a vehicle-mounted device, a smart home device, an augmented reality (AR)/virtual reality (VR) device, etc. The present disclosure does not limit any specific type of electronic devices.

Step 102, inserting a first image into part of or each of intervals between adjacent job pages of the job to be processed, and/or, inserting the first image before/after a specific job page included in the job to be processed. The first image is configured to determine whether to trigger color correction. Optionally, the job to be processed may include a plurality of job pages, and a job page may also be called a logical page. During an imaging process of the plurality of job pages, when adjacent job pages are transferred to physical papers, a certain interval may need to be maintained between adjacent physical papers. This interval may be called an inter-paper distance.

In some embodiments, the image forming device may insert the first image in the interval between adjacent job pages. Along a paper feeding direction (that is, a transfer direction of the transfer belt), the size of the first image may be smaller than the interval between adjacent job pages. The interval between adjacent job pages refers to an interval between an end of a previous job page and a front end of a next job page along the paper feeding direction. In the paper feeding direction, the height (size) of the first image is less than the interval between adjacent job pages. In this way, the first image may be printed between adjacent physical papers on the transfer belt without affecting the normal execution of printing the job to be processed on the physical paper. Accordingly, printout of the job to be processed may be executed normally.

In some other embodiments, the first image may be inserted as a job page between adjacent job pages of the job to be processed. This approach is equivalent to inserting an additional job page into the job to be processed. That is, at least one more logical page is added to the job to be processed. By inserting the first image in this way, the transfer image of subsequent job pages of the job to be processed may be continued after the first image is transferred on the transfer belt.

It may be understood that the first image may be inserted in an interval between every two job pages of the job to be processed (i.e. the first image may be inserted into each interval between adjacent job pages of the job to be processed). That is, the first image may be inserted in the interval between the first job page and the second job page, and the first image may also be inserted into the interval between the second job page and the third job page, until the first image is inserted into the interval between each two adjacent job pages. In addition, the first image may also be inserted before/after a specific job page included in the job to be processed. The specific job page may be any job page included in the job to be processed. Preferably, the specific job page may be the last job page of the job to be processed or the first job page of the job to be processed. For example, the first image may be inserted into an interval between the last job page of the current job to be processed and the first job page of the next job to be pended, or between the first job page and the second job page of the current job to processed, or between the last job page and the second last job page of the current job to be processed, or between the first job page of the current job to be processed and the last job page of a previous job to be processed.

Alternatively, the first image may be inserted at an interval of a plurality of job pages. For example, the first image is inserted into the interval between the first job page and the second job page, and the first image is not inserted into the interval between the second job page and the third job page, but the first image is inserted into the interval between the third job page and the fourth job page, and so on, until each of first images is inserted. Alternatively, the first image may be only inserted into the intervals of part of the job pages. For example, the first image may be inserted into the intervals of first 30 job pages in the job to be processed, or the first image may be inserted into the intervals of middle 40 job pages of the job to be processed. The present disclosure does not limit a specific interval to be inserted with the first image.

In one embodiment, the first image may also be inserted into an interval of a plurality of different jobs to be processed. For example, when two jobs to be processed need to be printed simultaneously, the first image may be inserted into the interval between completion of the first job to be processed and preparation for printing the second job to be processed.

The present disclosure does not limit a specific way of inserting the first image. An option that allows a user to select a specific way of inserting the first image may be set on a panel or a driver or other display device. For example, a user may choose to insert the first image into an interval between every two job pages of a job to be processed, to insert the first image before/after a specific page included in the job to be processed, to insert the first image at an interval of a plurality of job pages, to insert the first image only into intervals of a part of job pages, or to insert the first image into an interval between completion of a job to be processed and preparation for printing a next job to be processed. The first image may also be inserted based on a combination of above approaches as disclosed. For example, the first image may be inserted into part of or each of the intervals of the job pages of the job to be processed, and the first image may also be inserted into specific job pages included in the job to be processed. For example, the first image may be inserted into the intervals of middle 40 job pages of the job to be processed, and the first image may be inserted into the interval between completion of a job to be processed and preparation for printing a next job to be processed (i.e. the first image may be inserted after the last job page of the job to be processed). The present disclosure does not limit a specific approach. In this way, based on the detection result of the first image, the image forming device may determine whether a condition for triggering color correction is met.

In addition, the first image may also be inserted into part of or each of the job pages in the job to be processed. Further, the first image may be inserted into a blank portion of at least one job page of the job to be processed. The first image may be formed on a job page. Based on a detection result of the first image on each job page, the image forming device may determine whether a condition for triggering color correction is met. For example, the first image may be formed on the first job page or the third job page, or the first image may be formed at an interval of a plurality of job pages. Based on the detection result of the first image on the job page, the image forming device may determine whether the condition for triggering color correction is met.

In addition, the first image may also be inserted into part or each of the job pages in the job to be processed. Further, the first image may be inserted into the job pages within a preset range of page numbers of the job to be processed. Further, the first image may be inserted into a blank portion of at least one job page of the job to be processed. For example, the first image may be formed on job pages, such as, from the first job page to the thirtieth job page (the page number range is 1-30 pages), or from the thirtieth job page to the fortieth job page (the page number range is 30-40 pages), or from the fiftieth job page to the sixtieth job page (the page range is 50-60 pages). The first image may also be inserted into the blank portion of each job page of the jobs to be processed. The first image may also be inserted into a job page before/after a specific job page included in the job to be processed. The specific job page may be any job page included in the job to be processed. Preferably, the specific job page may be the last job page of the job to be processed or the first job page of the job to be processed. For example, the first image may be inserted into a blank portion of the last job page, or the first image may be inserted into a blank portion of the first job page. A specific implementation of the present disclosure may also be a combination of the above implementations. For example, the first image may be inserted on the 30th to 40th job pages (the page number range is 30-40 pages) and in the blank portion of the last job page. The present disclosure does not limit a specific implementation approach.

Step 103, obtaining the detection result of the transfer image formed by the first image on the image carrier. After the image forming device inserts the first image into the interval between adjacent job pages of the job to be processed, the first image may enter the image forming process along with the job to be processed. After the first image forms a transfer image on the image carrier, the CTD sensor disposed on the image carrier may detect the transfer image of the first image and generate a detection result. The CTD sensor may send the detection result to the processing component. Optionally, the first image may be imaged only on the image carrier but not transferred to the imaging medium.

Step 104, determining whether the detection result meets the condition for triggering color correction. Optionally, the detection result may include a color registration offset value or a color block density error value of the transfer image formed by the first image on the image carrier. The image forming device may determine whether the condition for triggering color correction is met based on the color registration offset value or the color block density error value in the detection result. When the condition for triggering color correction is met, step 105 may be executed.

Registration offset may be used to indicate a positional offset of a color that needs to be corrected relative to a reference color. When performing ACR correction, if there is misalignment, for example, when yellow and cyan are used to form a green image, the resulting image may be broken into two colors. That is, other colors (C, M, Y) that need to be corrected may have a positional offset relative to the reference color (K), i.e., a color registration offset. In this case, ACR correction may need to be performed.

The color block density error value may be used to indicate an error of the density value of a formed transfer image relative to the target reference density.

Step 105, when the condition for triggering color correction is met, the image forming device may perform color correction. Optionally, when the detection result sent by the CTD sensor meets the condition for triggering color correction, the image forming device may first suspend printing of remaining job pages of the job to be processed to perform color correction. Alternatively, the image forming device may perform color correction after completion of printing the current job to be processed. It may be understood that, a quantity of remaining job pages to be processed corresponding to the job to be processed may be used to determine whether to perform color correction immediately. When the quantity of remaining job pages to be processed is small (less than a certain threshold, such as 10 pages), printing of the remaining job pages to be processed corresponding to the current job to be processed may be completed first, and color correction may then be performed. When the quantity of remaining job pages to be processed is large (greater than a certain threshold, such as 10 pages), color correction may be performed first. After color correction is completed, printing of the remaining job pages to be processed corresponding to the job to be processed may then be completed. In the present disclosure, the color correction may be triggered in time based on the detection result of the image, inserted in the interval between adjacent job pages during the printing process, on the transfer belt. Accordingly, timeliness of the image forming device executing the color correction method may be achieved, and the image quality of the image output by the image forming device may be improved.

Figure 6:
FIG. 6 illustrates a flow chart of another color correction method consistent with the disclosed embodiments of the present disclosure.

FIG. 6 illustrates a flow chart of another color correction method consistent with the disclosed embodiments of the present disclosure. As shown in FIG. 6, in one embodiment, processing steps of the method include steps 201-207.

Step 201, the image forming device acquiring a job to be processed.

Step 202, the image forming device determining a target correction mode from a plurality of correction modes. Optionally, the image forming device may preset a plurality of correction modes, and each correction mode may be associated with at least one correction trigger image. For example, a color block density correction mode and a color registration offset value correction mode may be preset. The color block density correction mode and the color registration offset value correction mode may respectively be associated with at least one correction trigger image. The color block density correction mode may determine whether the condition for triggering color correction is met by detecting the color block density of the transfer image formed by the first image. For example, when the color block density of a transfer image formed deviates from the preset color density, density correction may need to be performed such that the color block density of the transfer image formed is within a preset color density range. The preset color density range may be stored in a storage unit of the processing component of the image forming device in advance, or may be set through the panel of the image forming device. The present disclosure does not limit how the preset color density range is pre-set or pre-stored. The registration offset value correction mode may determine whether the condition for triggering color correction is met by detecting the registration offset value of the transfer image formed by the first image.

In one embodiment of the present disclosure, after acquiring the job to be processed, the image forming device may determine a target correction mode from a plurality of correction modes. Optionally, based on one or more of the current ambient temperature and humidity, the quantity of printed pages of the jobs to be processed, whether the developing component is replaced, or the temperature change of the laser scanning unit, the image forming device may determine the target correction mode from a plurality of correction modes.

For example, it may be determined whether the temperature and humidity of the environment where the image forming device is located reaches a preset threshold. When the preset threshold is reached, at least one of the ACR correction and the density correction may be performed. For example, when the image forming device detects that the ambient temperature is greater than 40° C. and the humidity is greater than 60% when the image forming device is started, the density correction and the ACR correction may be performed simultaneously.

It may be determined whether a cumulative quantity of printed pages for the jobs to be processed exceeds a preset threshold. At least one of the ACR correction and the density correction may be performed when the preset threshold is reached. For example, when the cumulative color printing exceeds 1,000 pages, the density correction and the ACR correction may be performed simultaneously.

When it is determined that the developing component is replaced with a new developing component, at least one of the ACR correction and the density correction may be performed. For example, when at least one of the C developing component, M developing component, Y developing component, and K developing component is replaced with a new developing component, the density correction and the ACR correction may be performed simultaneously.

It may be determined whether the temperature change of the laser scanning unit reaches a preset threshold. When the preset threshold is reached, at least one of the ACR correction and the density correction may be performed. For example, when it is detected that the temperature change of the laser scanning unit exceeds 5° C., the ACR correction may be performed.

It may be understood that, the target correction mode (i.e. at least one of the density correction and the ACR correction) may also be determined from a plurality of correction modes based one or more of the current ambient temperature and humidity, the quantity of printed pages of the job to be processed, whether the developing component is replaced, and the temperature change of the laser scanning unit. A corresponding correction trigger image may be determined based on the target correction mode.

Step 203, from at least one correction trigger image associated with the target correction mode, the image forming device determining a first image for insertion into part of or each of intervals between adjacent job pages of the job to be processed, and/or from the at least one correction trigger image associated with the target correction mode, determining the first image for insertion before/after a specific job page included in the job to be processed.

Step 204, the image forming device inserting the first image into part of or each of the intervals between adjacent job pages of the job to be processed, and/or inserting the first image before/after a specific job page included in the job to be processed. It may be understood that the first image may be inserted into each interval between two job pages of the job to be processed (i.e. the first image may be inserted into the interval between adjacent job pages of the job to processed). That is, the first image may be inserted in the interval between the first job page and the second job page, and the first image may also be inserted into the interval between the second job page and the third job page, until the first image is inserted into each interval between two adjacent job pages. In addition, the first image may also be inserted before/after a specific job page included in the job to be processed. The specific job page may be any job page included in the job to be processed. Preferably, the specific job page may be the last job page of the job to be processed or the first job page of the job to be processed. For example, the first image may be inserted into an interval between the last job page of the current job to be processed and the first job page of the next job to be pended, or between the first job page and the second job page of the current job to processed, or between the last job page and the second last job page of the job to be processed, or between the first job page of the current job to be processed and the last job page of the previous job to be processed.

Alternatively, the first image may be inserted at an interval of a plurality of job pages. For example, the first image may be inserted into the interval between the first job page and the second job page, and the first image may not be inserted into the interval between the second job page and the third job page, but the first image may be inserted into the interval between the third job page and the fourth job page, and so on, until each first images is inserted. Alternatively, the first image may be only inserted into the intervals of a part of the job pages. For example, the first image may be inserted into the intervals of first 30 job pages in the job to be processed, or the first image may be inserted into the intervals of middle 40 job pages in the job to be processed. The present disclosure does not limit a specific interval to be inserted with the first image.

In one embodiment, the first image may also be inserted into an interval of a plurality of different jobs to be processed. For example, when two jobs to be processed need to be printed simultaneously, the first image may be inserted into an interval between completion of a first job to be processed and preparation for printing a second job to be processed.

The present disclosure does not limit a specific way of inserting the first image. An option that allows a user to select a specific way of inserting the first image may be set on a panel or a driver or other display devices. For example, a user may choose to insert the first image into each interval between two adjacent job pages of a job to be processed, to insert the first image before/after a specific page included in the job to be processed, to insert the first image at an interval of a plurality of job pages, to insert the first image only into intervals of a part of job pages, or to insert the first image into the interval between completion of a job to be processed and preparation for printing a next job to be processed. The first image may also be inserted based on a combination of above approaches as disclosed herein. That is, the first image may be inserted into part of or each of the intervals of the job pages of the job to be processed, and the first image may also be inserted into specific job pages included in the job to be processed. For example, the first image may be inserted into the intervals of middle 40 job pages of the job to be processed, and the first image may also be inserted into the interval between completion of a job to be processed and preparation for printing a next job to be processed (i.e. the first image may be inserted after the last job page of the job to be processed). The present disclosure does not limit a specific way of inserting the first image. In this approach, based on the detection result of the first image, the image forming device may determine whether the condition for triggering color correction is met.

In addition, the first image may also be inserted into part of or each of the job pages in the job to be processed. Further, the first image may be inserted into a blank portion of at least one job page of the job to be processed. The first image may be formed on a job page. Based on a detection result of the first image on each job page, the image forming device may determine whether a condition for triggering color correction is met. For example, the first image may be formed on the first job page or the third job page, or the first image may be formed at an interval of a plurality of job pages. Based on the detection result of the first image on the job page, the image forming device may determine whether a condition for triggering color correction is met.

In addition, the first image may also be inserted into part of or each of the job pages in the job to be processed. Further, the first image may be inserted into job pages within a preset range of page numbers of the job to be processed. Further, the first image may be inserted into a blank portion of at least one job page of the job to be processed. For example, the first image may be formed on job pages, such as, from the first job page to the thirtieth job page (the page number range is 1-30 pages), or from the thirtieth job page to the fortieth job page (the page number range is 30-40 pages), or from the fiftieth job page to the sixtieth job page (the page range is 50-60 pages). The first image may also be inserted into a blank portion of each job page of the jobs to be processed. The first image may be inserted into a job page before/after a specific job page included in the job to be processed. The specific job page may be any job page included in the job to be processed. Preferably, the specific job page may be the last job page of the job to be processed or the first job page of the job to be processed. For example, the first image may be inserted into a blank portion of the last job page, or the first image may be inserted into a blank portion of the first job page. A specific implementation of the present disclosure may also be a combination of the above implementations. For example, the first image may be inserted on the 30th to 40th job pages (the page number range is 30-40 pages) and in the blank portion of the last job page. The present disclosure does not limit a specific implementation approach.

Step 205, the image forming device obtaining the detection result of the transfer image formed by the first image on the image carrier, the detection result including the color registration offset value or the color block density error value of the transfer image.

Step 206, the image forming device determining whether the color registration offset value or the color block density error value of the transfer image meets the condition for triggering color correction.

Step 207, when the color registration offset value or the color block density error value of the transfer image meets the condition for triggering color correction, performing color correction.

In the disclosed embodiments of the present disclosure, the target correction mode may be determined from a plurality of correction modes based on one or more of the current ambient temperature and humidity, the quantity of printed pages of the jobs to be processed, whether the developing component is replaced, and the temperature change of the laser scanning unit. Accordingly, the correction mode selected, and the first image added to the interval between adjacent job pages, may be closely matched with the current job to be processed. The timing of triggering color correction determined in this way may be reasonable.

Furthermore, in the present disclosure, the first image inserted into the job to be processed may include a preset color block density or color block position. When the image quality output by the image forming device is good, the color registration offset value or color block density error value collected by the CTD sensor may be within a preset range value. When the color registration offset value or color block density error value collected by the CTD sensor exceeds the preset range value, it may be determined that the condition for triggering color correction is currently reached, and the image forming device may perform color correction.

In the disclosed embodiments of the present disclosure, the color registration offset value or the color block density error value of the current transfer image may represent the imaging quality of the image currently output by the image forming device. Accordingly, the timing of triggering color correction determined based on the color registration offset value or color block density error value of the current transfer image may be timely and accurate. As such, the situation where the image quality output by the image forming device is already poor but color correction has not yet been triggered may be avoided. In addition, after the image forming device determines to perform color correction, color correction may be performed on the remaining job of the current job to be processed, or color correction may be performed after the execution of the current job to be processed is completed. It may be understood that, the quantity of remaining job pages to be processed corresponding to the job to be processed may be used to determine whether to perform color correction immediately. When the quantity of remaining job pages is small (less than a certain threshold, such as 10 pages), printing the remaining job pages to be processed corresponding to the current job to be processed may be completed first, and color correction may then be performed. When the quantity of remaining job pages to be processed is large (greater than a certain threshold, such as 10 pages), color correction may be performed first. After color correction is completed, printing the remaining job pages to be processed corresponding to the job to be processed may then be completed.

Figure 7:
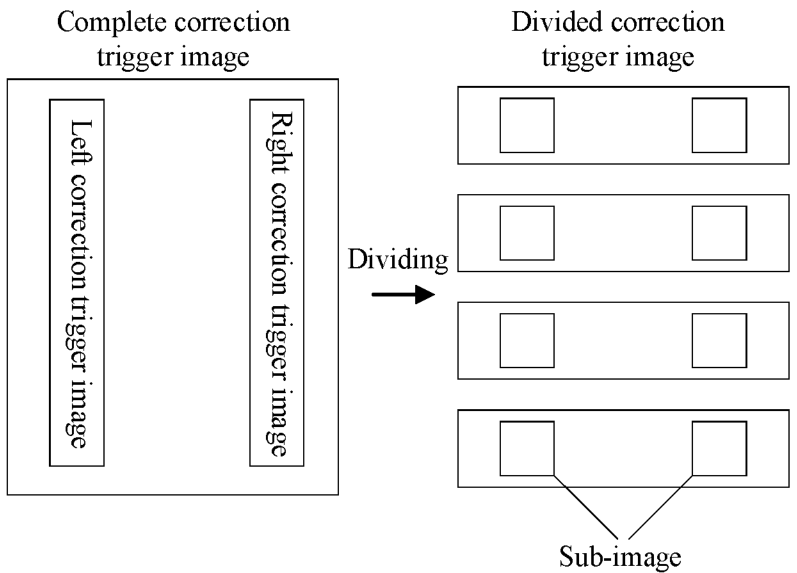
FIG. 7 illustrates a schematic diagram of dividing a complete correction trigger image into a plurality of sub-images, consistent with the disclosed embodiments of the present disclosure.

FIG. 7 illustrates a schematic diagram of dividing a complete correction trigger image into a plurality of sub-images, consistent with the disclosed embodiments of the present disclosure. As shown in FIG. 7, a complete correction trigger image may be stored in advance in the storage unit of the image forming device. Optionally, the complete correction trigger image may include a left correction trigger image and a right correction trigger image. Optionally, only one of the left correction trigger image or the right correction trigger image is selected as the correction trigger image. For example, the left correction trigger image is used for density correction. The left correction trigger image and the right correction trigger image may be disposed on two sides of the job page along a length direction of the job page. When the complete correction trigger image is image-formed as a job page, the transfer images of the left correction trigger image and the right correction trigger image may be detected by the left CTD sensor and the right CTD sensor, respectively. As shown in FIG. 7, in one embodiment, the complete correction trigger image may be divided into a plurality of sub-images. Each sub-image includes a left color block and a right color block, and along the transfer direction of the imaging medium, the height of the sub-image is smaller than the interval between adjacent job pages.

Figure 8:
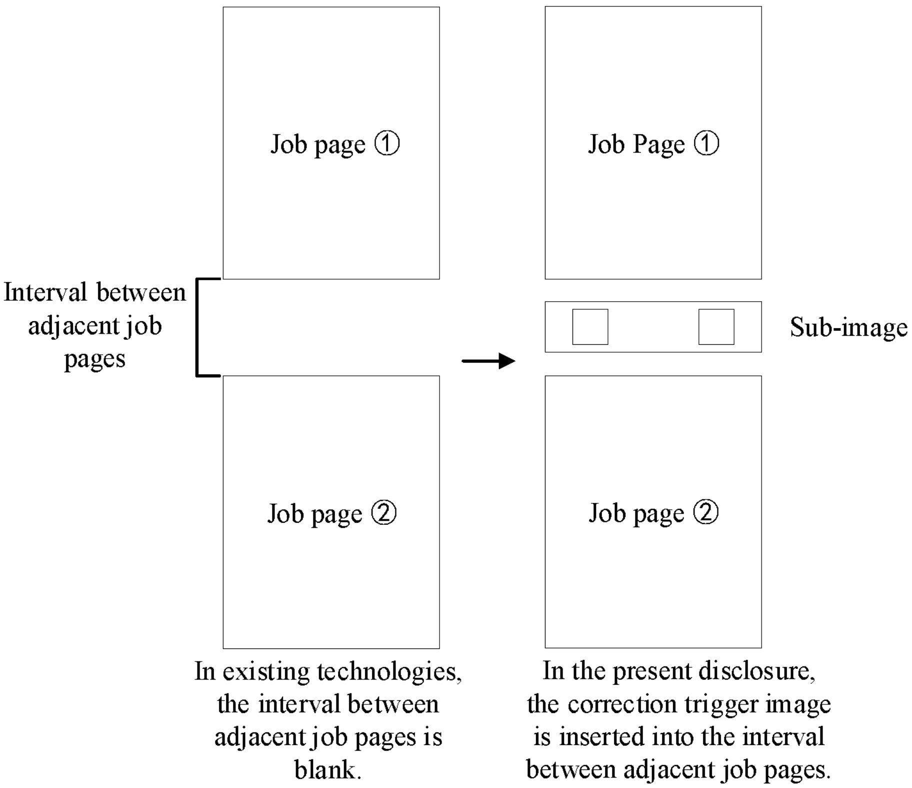
FIG. 8 illustrates a schematic diagram of inserting a first image into part of or each of intervals between adjacent job pages of a job to be processed, consistent with the disclosed embodiments of the present disclosure.

In existing technologies, the interval between adjacent job pages of a job to be processed may be blank. FIG. 8 illustrates a schematic diagram of inserting a first image into part of or each of intervals between adjacent job pages of a job to be processed. As shown in FIG. 8, in one embodiment, after the job to be processed is acquired, a sub-image may be inserted into each interval between adjacent job pages of the job to be processed. The sub-image inserted may be the first image mentioned above. The first image may be pre-stored in the memory of the image forming device, and the pre-stored first image may be directly used as the first image. Understandably, a specific area may also be selected as the first image according to an algorithm setting that is set in the image forming device. For example, a middle part of the complete first image may be selected as the first image. The present disclosure does not limit a specific first image.

In some embodiments, after the complete correction trigger image is divided into a plurality of sub-images, each sub-image may be numbered. Correspondingly, the sub-images may be inserted into the intervals of adjacent job pages of the job to be processed one by one according to the numbering sequence of the sub-images. For example, the sub-image numbered 1 may be inserted into the interval between job page (1) and job page (2), the sub-image numbered 2 may be inserted into the interval between job page (2) and job page 3, and so on, until each interval between adjacent job pages of the job to be processed is inserted with the sub-images. In some embodiments, after the image forming device obtains the detection results of each of the sub-images inserted into the job to be processed or the detection results of part of the sub-images required to complete color correction, the image forming device may then determine whether the condition for triggering color correction is met based on the detection results obtained. In the present disclosure, the sub-images used to trigger color correction are inserted into the interval between adjacent job pages of the job to be processed, such that the timing of triggering color correction may be determined without affecting normal execution of the job to be processed.

Figure 9:
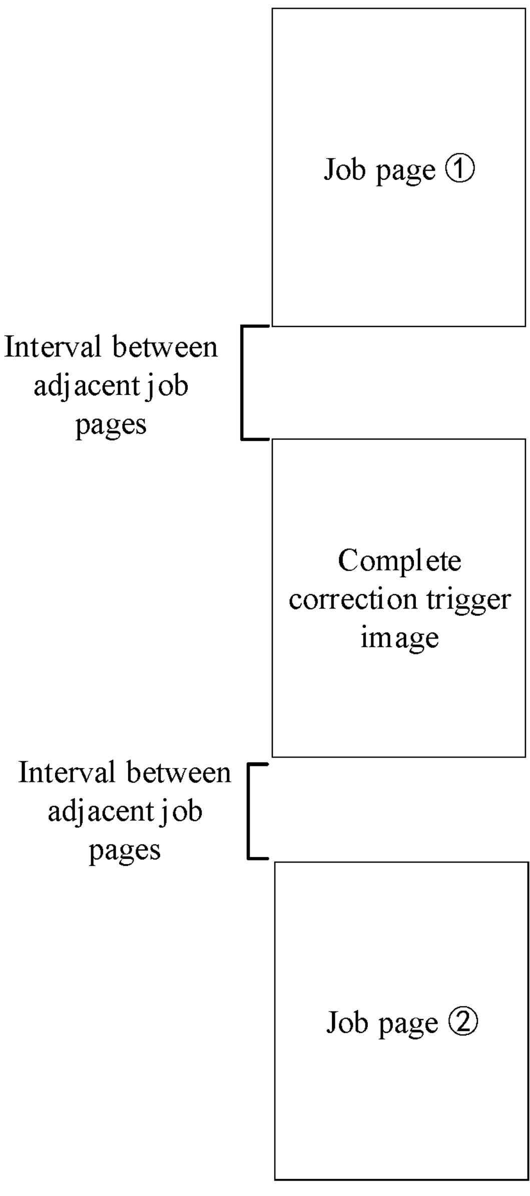
FIG. 9 illustrates another schematic diagram of inserting a first image into part of or each of intervals between adjacent job pages of a job to be processed, consistent with the disclosed embodiments of the present disclosure.

FIG. 9 illustrates another schematic diagram of inserting a first image into part of or each of intervals between adjacent job pages of a job to be processed, consistent with the disclosed embodiments of the present disclosure. As shown in FIG. 9, in one embodiment, the complete correction trigger image may be inserted as a job page between adjacent job pages of the job to be processed, and the complete correction trigger image is the first image. As shown in FIG. 9, the complete correction trigger image may be inserted between job page (1) and job page 2. The complete correction trigger image is a job page, and a certain interval may be set between the job page and job pages (1) and (2). In one embodiment, a plurality of complete correction trigger images may be inserted into the job to be processed. In the present disclosure, the correction trigger image may be inserted into the job pages of the job to be processed as a job page. After the transfer of the correction trigger image is completed, the transfer of the job to be processed may be continued. The job to be processed may not be interrupted, and execution of job to be processed may not be affected.

Figure 10:
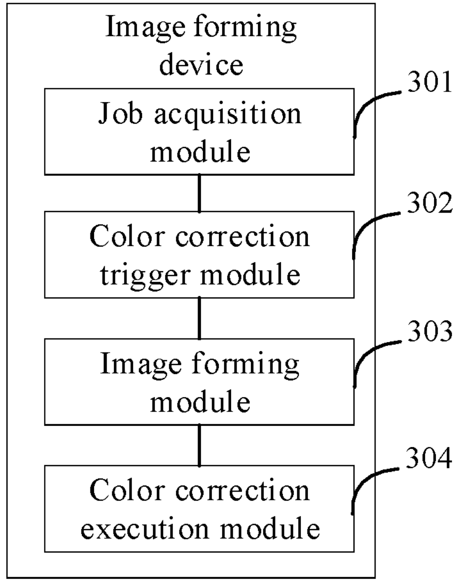
FIG. 10 illustrates a schematic structure diagram of an image forming device consistent with the disclosed embodiments of the present disclosure.

The present disclosure also provides an image forming device. FIG. 10 illustrates a schematic structure diagram of an image forming device consistent with the disclosed embodiments of the present disclosure. As shown in FIG. 10, the image forming device includes: a job acquisition module 301, a color correction trigger module 302, an image forming module 303, and a color correction execution module 304. The image forming module 303 includes: a laser scanning unit, a developing component, and an image carrier. A detection device may be disposed on the image carrier.

The job acquisition module 301 is configured to acquire a job to be processed. The color correction trigger module 302 is configured to insert a first image into a part of or each of intervals between adjacent job pages of the job to be processed, and/or, insert the first image before/after a specific job page included in the job to be processed. The first image is configured to determine whether to trigger color correction.

The image forming module 303 is configured to form a transfer image of the first image on an image carrier through the laser scanning unit and the developing component. The detection device is configured to obtain a detection result of the transfer image formed by the first image on the image carrier and send the detection result to the color correction trigger module 302.

The color correction trigger module 302 is also configured to determine whether a detection result meets the condition for triggering color correction. The color correction execution module 304 is configured to perform color correction when the condition for triggering color correction is met.

In one embodiment, when the image forming device acquires a job to be processed, the image forming device may insert the first image into part of or each of the intervals between adjacent job pages of the job to be processed, and/or insert the first image before/after a specific job page included in the job to be processed. The first image may enter an image forming workflow along with the job to be processed. During an image-forming process for the first image, an image forming device may acquire a detection result of a transfer image formed based on the first image. According to the detection result, the image forming device may determine image quality of a currently output image, and also determine whether a condition for triggering color correction is currently met. When the condition for triggering color correction is met, color correction may be performed in time. Accordingly, the timeliness of color correction performed by the image forming device and the image quality of the image output by the image forming device may be improved.

Optionally, the color correction trigger module 302 is specifically configured to: divide a complete correction trigger image into a plurality of sub-images, where along a transfer direction of an imaging medium, the height of the sub-image is less than the interval between adjacent job pages; and insert the sub-image into part of or each of the intervals between adjacent job pages of the job to be processed, and use the sub-image as the first image. In one embodiment, the sub-images used to trigger color correction are inserted into part of or each of the intervals between adjacent job pages of the job to be processed, such that the timing of triggering color correction may be determined without affecting normal execution of the job to be processed.

Alternatively, the complete correction trigger image may be inserted as a job page between part of or each of adjacent job pages of the job to be processed, and the complete correction trigger image may be used as the first image. In the present disclosure, the correction trigger image may be inserted into the job pages of the job to be processed as a job page. After the transfer of the correction trigger image is completed, the transfer of the job to be processed may be continued. Accordingly, the job to be processed may not be interrupted, and execution of the job to be processed may not be affected.

Alternatively, the complete correction trigger image may be divided into a plurality of sub-images. Along the transfer direction of the imaging medium, the height of the sub-images may be smaller than the interval between adjacent job pages. The sub-image may be inserted before/after a specific job page included in the job to be processed, and the sub-image may be used as the first image. In one embodiment, the correction trigger image may be inserted before/after a specific job page included in the job to be processed. The job to be processed may not be interrupted, and execution of the job to be processed may not be affected.

Alternatively, the complete correction trigger image may be inserted as a job page before/after a specific job page included in the job to be processed, and the complete correction trigger image may be used as the first image. In one embodiment, the complete correction trigger image may be inserted before/after a specific job page included in the job to be processed. The job to be processed may not be interrupted, and execution of the job to be processed may not be affected.

Optionally, the color correction trigger module 302 is specifically configured to determine whether the color registration offset value, or the color block density error value of the transfer image formed by the first image on the image carrier, meets the condition for triggering color correction.

In the present disclosure, the color registration offset value or the color block density error value of the current transfer image may represent the imaging quality of the image currently output by the image forming device. Accordingly, the timing of triggering color correction determined based on the color registration offset value or color block error density value of the current transfer image may be timely and accurate. As such, the situation where the image quality output by the image forming device is already poor but color correction has not yet been triggered may be avoided.

Optionally, the color correction trigger module 302 is specifically configured to: determine, based on detection results of each of or part of the first images inserted into part of or each of the intervals between adjacent job pages of the job to be processed and/or inserted before/after specific job pages included in the job to be processed, whether the condition for triggering color correction is met.

Optionally, the color correction trigger module 302 is also configured to: determine a target correction mode from a plurality of correction modes before inserting the first image into part of or each of the intervals between adjacent job pages of the job to be processed, before inserting the first image before/after a specific job page included in the job to be processed, each correction mode being associated with at least one correction trigger image; and determine a first image, from the at least one correction trigger image associated with the target correction mode, to be inserted into part of or each of the intervals between adjacent job pages of the job to be processed, or to be inserted before/after a specific job page included in the job to be processed.

Optionally, the color correction trigger module 302 is specifically configured to determine a target correction mode from a plurality of correction modes, based on one or more of the current ambient temperature and humidity, the quantity of printed pages of the jobs to be processed, whether the developing component is replaced, and the temperature change of the laser scanning unit. In one embodiment, the target correction mode is determined from a plurality of correction modes, based on one or more of the current ambient temperature and humidity, the quantity of printed pages of the jobs to be processed, whether the developing component is replaced, and the temperature change of the laser scanning unit. Accordingly, the selected correction mode and the first image inserted into the interval of adjacent job pages may be closely matched with the current job to be processed, and the determined timing of triggering color correction may be reasonable.

Optionally, the color correction execution module 304 is specifically configured to: suspend printing of remaining job pages of the job to be processed to perform color correction; or after completing the printing of the job to be processed, perform color correction; or determine whether to perform color correction immediately, based on the quantity of remaining job pages to be processed corresponding to the job to be processed.

The image forming device provided by the present disclosure may perform the color correction method provided by the present disclosure. For parts of the image forming device that are not described in detail in the present disclosure, reference may be made to descriptions of the embodiments shown in FIGS. 2 to 9. Implementation process and technical effects of the image forming device provided by the present disclosure may be understood with reference to the descriptions of the embodiments shown in FIGS. 2 to 9, and will not elaborated here.

It should be noted that divisions between the modules of the image forming device shown in FIG. 10 are divisions of logical functions only. Different modules of the image forming device shown in FIG. 10 may be fully or partially integrated into a physical entity during actual implementation, or may be physically separated. These modules may each be implemented in the form of software calls through processing components, and may also each be implemented in the form of hardware. Alternatively, some modules may be implemented in the form of software calls through processing elements, and some other modules may be implemented in the form of hardware. In addition, each or part of the modules may be integrated together or implemented independently. During the implementation process, each step of the color correction method or each of the modules in the image forming device may be completed through an integrated logic circuit of hardware in the processor element, or instructions in form of software.

For example, the modules in the image forming device may be one or more integrated circuits configured to implement the color correction methods, such as: one or more application specific integrated circuit (ASIC), or one or more digital Signal processor (DSP), or one or more field programmable gate array (FPGA). For another example, the modules in the image forming device may be integrated together and implemented in form of a system-on-a-chip (SOC).

Figure 11:
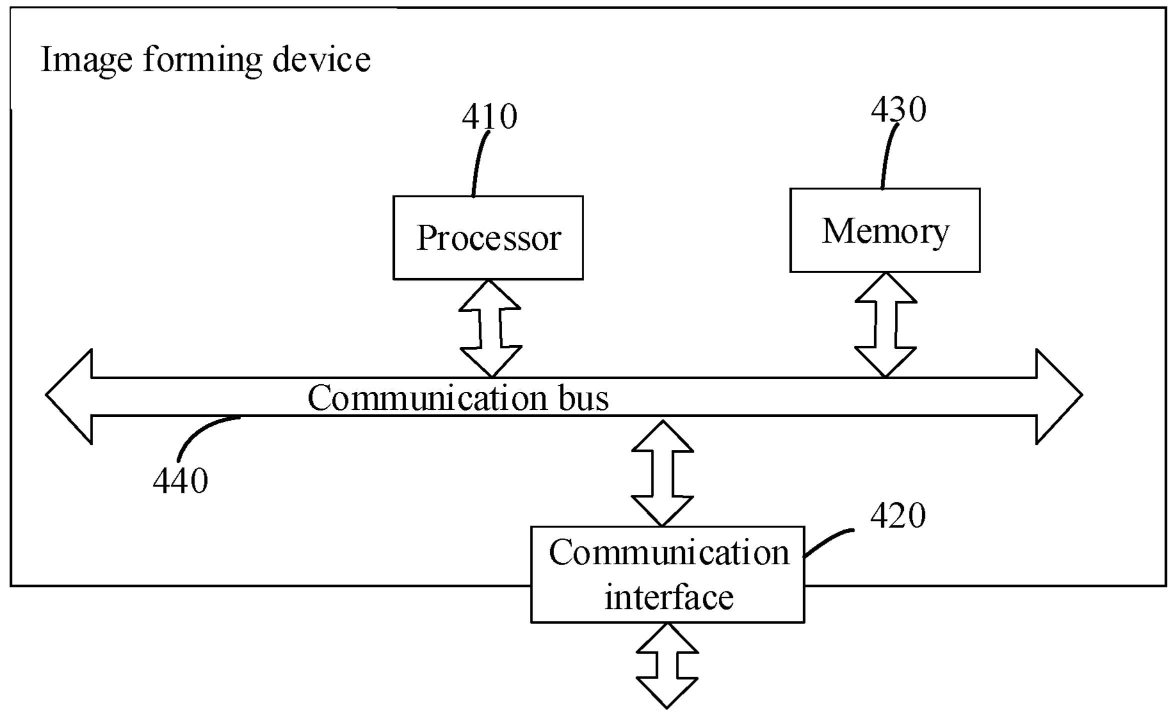
FIG. 11 illustrates a schematic structure diagram of another image forming device consistent with the disclosed embodiments of the present disclosure.

FIG. 11 illustrates a schematic structure diagram of another image forming device consistent with the disclosed embodiments of the present disclosure. As shown in FIG. 11, the image forming device may be embodied in form of a general computing device. Components of the computing device may include, but are not limited to: one or more processor 410, a communication interface 420, a memory 430, and a communication bus 440 connecting different system components, including the processor 410, the communication interface 420, and the memory 430.

The communication bus 440 represents one or more of a plurality of types of bus structures, including a memory bus or memory controller, a peripheral bus, a graphics accelerated port, a processor, or a local bus using any of a plurality of bus structures. For example, the plurality of bus structures includes but are not limited to Industry Standard Architecture (ISA) bus, Micro Channel Architecture (MAC) bus, enhanced ISA bus, Video Electronics Standards Association (VESA) local area bus, and Peripheral Component Interconnection (PCI) bus.

Electronic devices typically include a variety of computer system readable media. The media may be any available media that may be accessed by an electronic device, including volatile and nonvolatile media, removable and non-removable media.

The memory 430 may include computer system readable media in the form of volatile memory, such as random access memory (RAM) and/or cache memory. Electronic devices may also include other removable/non-removable, volatile/non-volatile computer system storage media. The memory 430 may include at least one program product having a set of (e.g., at least one) program modules configured to perform functions of the embodiments of the present disclosure.

The processor 410 may execute programs stored in the memory 430 to perform various functional applications and data processing, for example, implementing the color correction method provided by the present disclosure.

The present disclosure provides a computer-readable storage medium. The computer-readable storage medium may include a stored program. When running, the program may control the device where the computer-readable storage medium is located to execute the color correction method provided by the present disclosure.

The computer-readable storage medium may include one computer-readable medium or a combination of a plurality of computer-readable media. The computer-readable medium may be a computer-readable signal medium or a computer-readable storage medium. The computer-readable storage medium may be, for example, but is not limited to, an electrical, magnetic, optical, electromagnetic, infrared, or semiconductor system, facility or device, or a combination thereof. More specific examples (non-exhaustive list) of the computer-readable storage media may include: electrical connection with one or more conductors, portable computer disk, hard drive, random access memory (RAM), read only memory (ROM), Erasable Programmable Read Only Memory (EPROM) or flash memory, optical fiber, portable compact disk read-only memory (CD-ROM), optical storage device, magnetic storage device, or a combination thereof. In the present disclosure, a computer-readable storage medium may be a tangible medium that contains or stores a program, and the program may be used by or in conjunction with an instruction execution system, facility, or device.

In the present disclosure, term "at least one" refers to one or more, and term "plurality" refers to two or more. Term "and/or" describes relationships between associated objects, indicating that there may be three relationships. For example, "A and/or B" may represent existence of A alone, existence of A and B simultaneously, or existence of B alone, where A and B may each be singular or plural. Character "/" generally indicates that the related objects are in an "or" relationship.

Those of ordinary skills in the art may realize that a unit and an algorithm step in an embodiment of the present disclosure may be implemented by a combination of electronic hardware, computer software and electronic hardware. A function of a technical solution in the present disclosure may be performed in hardware or software, depending on specific applications and design constraints of the technical solution. For a specific application, those of ordinary skills in the art may implement an embodiment of the present disclosure using different methods, but such implementations should not be considered beyond the scope of the present disclosure.

The embodiments disclosed in the present disclosure are exemplary only and not limiting the scope of the present disclosure. Various combinations, alternations, modifications, or equivalents to the technical solutions of the disclosed embodiments may be obvious to those skilled in the art and may be included in the present disclosure. Without departing from the spirit of the present disclosure, the technical solutions of the present disclosure may be implemented by other embodiments, and such other embodiments are intended to be encompassed within the scope of the present disclosure.

What is claimed is:

1. A color correction method, comprising:

acquiring a job to be processed;

inserting a first image into part of or each of intervals between adjacent job pages of the job to be processed, and/or, inserting the first image before/after a specific job page included in the job to be processed, wherein the first image is configured to trigger color correction;

obtaining a detection result of a transfer image formed by the first image on an image carrier;

determining whether the detection result meets a condition for triggering color correction; and when the detection result meets the condition for triggering color correction, performing color correction, wherein before inserting the first image into part of or each of the intervals between adjacent job pages of the job to be processed, and/or, inserting the first image before/after a specific job page included in the job to be processed, the method further comprises:

determining a target correction mode by selecting the target correction mode from a plurality of correction modes, based on one or more of parameters including current ambient temperature and humidity, a quantity of printed pages of the job to be processed, whether a developing component is replaced, and temperature change of the laser scanning unit.

2. The color correction method according to claim 1, wherein inserting the first image into part of or each of the intervals between adjacent job pages of the job to be processed, and/or, inserting the first image before/after a specific job page included in the job to be processed, includes:

dividing a complete correction trigger image into a plurality of sub-images, wherein along a transfer direction of an imaging medium, a height of a sub-image of the plurality of sub-images is less than the intervals between adjacent job pages; and inserting the sub-image into part of or each of the intervals between adjacent job pages of the job to be processed, wherein the sub-image is used as the first image; or inserting the complete correction trigger image, as a job page, between part of or each of adjacent job pages of the job to be processed, wherein the complete correction trigger image is used as the first image; or dividing the complete correction trigger image into the plurality of sub-images, wherein along the transfer direction of the imaging medium, the height of the sub-image is less than the intervals between adjacent job pages; and inserting the sub-image before/after a specific job page included in the job to be processed, wherein the sub-image is used as the first image; or inserting the complete correction trigger image, as a job page, before/after a specific job page included in the job to be processed, wherein the complete correction trigger image is used as the first image.

3. The color correction method according to claim 1, wherein determining whether the detection result meets the condition for triggering color correction includes:

determining whether a color registration offset value, or a color block density error value of the transfer image formed by the first image on the image carrier, meets the condition for triggering color correction.

4. The color correction method according to claim 1, wherein determining whether the detection result meets the condition for triggering color correction includes:

determining whether the condition for triggering color correction is met, based on the detection result of each of or part of the first images, inserted into part of or each of the intervals between adjacent job pages of the job to be processed and/or inserted before/after a specific job page included in the job to be processed.

5. The color correction method according to claim 1, wherein each correction mode of the plurality of correction modes is associated with at least one correction trigger image; and the method further comprises: from the at least one correction trigger image associated with the target correction mode, determining the first image to be inserted into part of or each of the intervals between adjacent job pages of the job to be processed, and/or to be inserted before/after a specific job page included in the job to be processed.

6. The color correction method according to claim 1, wherein the plurality of correction modes includes:

a color block density correction mode; and a color registration offset value correction mode.

7. The color correction method according to claim 1, wherein when the detection result meets the condition for triggering color correction, performing color correction, includes:

suspending printing of remaining job pages of the job to be processed to perform color correction; or after the printing of the job to be processed is completed, performing color correction; or determining whether to perform color correction immediately, based on a quantity of remaining job pages to be processed corresponding to the job to be processed.

8. An image forming device, comprising:

a processor and a memory communicatively connected to the processor, wherein a computer program is stored in the memory, and when the computer program is executed, the processor is configured to:

acquire a job to be processed;

insert a first image into part of or each of intervals between adjacent job pages of the job to be processed, and/or, insert the first image before/after a specific job page included in the job to be processed, wherein the first image is configured to trigger color correction;

obtain a detection result of a transfer image formed by the first image on an image carrier;

determine whether the detection result meets a condition for triggering color correction; and when the detection result meets the condition for triggering color correction, perform color correction, wherein before inserting the first image into part of or each of the intervals between adjacent job pages of the job to be processed, and/or, inserting the first image before/after a specific job page included in the job to be processed, the processor is configured for:

determining a target correction mode by selecting the target correction mode from a plurality of correction modes, based on one or more of parameters including current ambient temperature and humidity, a quantity of printed pages of the job to be processed, whether a developing component is replaced, and temperature change of the laser scanning unit.

9. The device according to claim 8, wherein the processor is configured for:

dividing a complete correction trigger image into a plurality of sub-images, wherein along a transfer direction of an imaging medium, a height of a sub-image of the plurality of sub-images is less than the intervals between adjacent job pages; and inserting the sub-image into part of or each of the intervals between adjacent job pages of the job to be processed, wherein the sub-image is used as the first image; or inserting the complete correction trigger image, as a job page, between part of or each of adjacent job pages of the job to be processed, wherein the complete correction trigger image is used as the first image; or dividing the complete correction trigger image into the plurality of sub-images, wherein along the transfer direction of the imaging medium, the height of the sub-image is less than the intervals between adjacent job pages; and inserting the sub-image before/after a specific job page included in the job to be processed, wherein the sub-image is used as the first image; or inserting the complete correction trigger image, as a job page, before/after a specific job page included in the job to be processed, wherein the complete correction trigger image is used as the first image.

10. The device according to claim 8, wherein the processor is configured for:

determining whether a color registration offset value, or a color block density error value of the transfer image formed by the first image on the image carrier, meets the condition for triggering color correction.

11. The device according to claim 8, wherein the processor is configured for:

determining whether the condition for triggering color correction is met, based on the detection result of part of or each of the first images, inserted into part of or each of the intervals between adjacent job pages of the job to be processed and/or inserted before/after a specific job page included in the job to be processed.

12. The device according to claim 8, wherein each correction mode of the plurality of correction modes is associated with at least one correction trigger image; and the processor is further configured for: from the at least one correction trigger image associated with the target correction mode, determining the first image to be inserted into part of or each of the intervals between adjacent job pages of the job to be processed; and/or, from the at least one correction trigger image associated with the target correction mode, determining the first image to be inserted before/after a specific job page included in the job to be processed.

13. The device according to claim 8, wherein the plurality of correction modes includes:

a color block density correction mode; and a color registration offset value correction mode.

14. The device according to claim 8, wherein the processor is configured for:

suspending printing of remaining job pages of the job to be processed to perform color correction; or after the printing of the job to be processed is completed, performing color correction; or determining whether to perform color correction immediately, based on a quantity of remaining job pages to be processed corresponding to the job to be processed.

15. A non-transitory computer-readable storage medium, including a stored program, wherein:

when the stored program is in operation, the stored program controls a device where the computer-readable storage medium is located to perform a color correction method comprising:

acquiring a job to be processed;

inserting a first image into part of or each of intervals between adjacent job pages of the job to be processed, and/or, inserting the first image before/after a specific job page included in the job to be processed, wherein the first image is configured to trigger color correction;

obtaining a detection result of a transfer image formed by the first image on an image carrier;

determining whether the detection result meets a condition for triggering color correction; and when the detection result meets the condition for triggering color correction, performing color correction, wherein before inserting the first image into part of or each of the intervals between adjacent job pages of the job to be processed, and/or, inserting the first image before/after a specific job page included in the job to be processed, the color correction method further comprises:

determining a target correction mode by selecting the target correction mode from a plurality of correction modes, based on one or more of parameters including current ambient temperature and humidity, a quantity of printed pages of the job to be processed, whether a developing component is replaced, and temperature change of the laser scanning unit.

16. The non-transitory computer-readable storage medium according to claim 15, wherein inserting the first image into part of or each of the intervals between adjacent job pages of the job to be processed, and/or, inserting the first image before/after a specific job page included in the job to be processed, includes:

dividing a complete correction trigger image into a plurality of sub-images, wherein along a transfer direction of an imaging medium, a height of a sub-image of the plurality of sub-images is less than the intervals between adjacent job pages; and inserting the sub-image into part of or each of the intervals between adjacent job pages of the job to be processed, wherein the sub-image is used as the first image; or inserting the complete correction trigger image, as a job page, between part of or each of adjacent job pages of the job to be processed, wherein the complete correction trigger image is used as the first image; or dividing the complete correction trigger image into the plurality of sub-images, wherein along the transfer direction of the imaging medium, the height of the sub-image is less than the intervals between adjacent job pages; and inserting the sub-image before/after a specific job page included in the job to be processed, wherein the sub-image is used as the first image; or inserting the complete correction trigger image, as a job page, before/after a specific job page included in the job to be processed, wherein the complete correction trigger image is used as the first image.

17. The non-transitory computer-readable storage medium according to claim 15, wherein determining whether the detection result meets the condition for triggering color correction includes:

determining whether a color registration offset value, or a color block density error value of the transfer image formed by the first image on the image carrier, meets the condition for triggering color correction.

18. The non-transitory computer-readable storage medium according to claim 15, wherein determining whether the detection result meets the condition for triggering color correction includes:

determining whether the condition for triggering color correction is met, based on the detection result of part of or each of the first images, inserted into part of or each of the intervals between adjacent job pages of the job to be processed and/or inserted before/after a specific job page included in the job to be processed.

19. The non-transitory computer-readable storage medium according to claim 15, wherein each correction mode of the plurality of correction modes is associated with at least one correction trigger image; and the color correction method further comprises: from the at least one correction trigger image associated with the target correction mode, determining the first image to be inserted into part of or each of the intervals between adjacent job pages of the job to be processed; and/or, from the at least one correction trigger image associated with the target correction mode, determining the first image to be inserted before/after a specific job page included in the job to be processed.

20. The non-transitory computer-readable storage medium according to claim 15, wherein when the detection result meets the condition for triggering color correction, performing color correction, includes:

suspending printing of remaining job pages of the job to be processed to perform color correction; or after the printing of the job to be processed is completed, performing color correction; or determining whether to perform color correction immediately, based on a quantity of remaining job pages to be processed corresponding to the job to be processed.

* * * * *